UNITED STATES PATENT OFFICE.

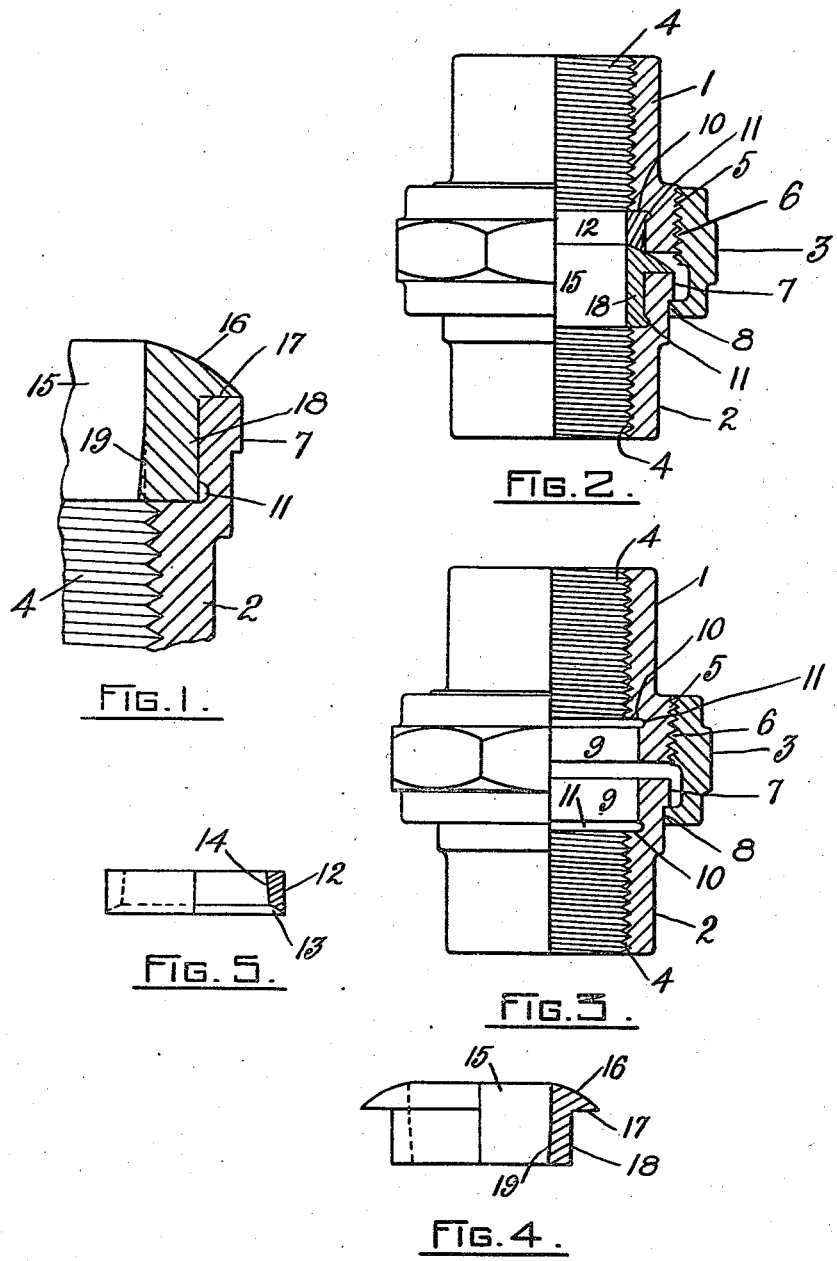

JESSE H. ROSS, OF PASCOAG, RHODE ISLAND, ASSIGNOR TO E. M. DART MANUFACTURING COMPANY, OF PROVIDENCE, RHODE ISLAND, A CORPORATION OF RHODE ISLAND.

METHOD OF MAKING PIPE-FITTINGS.

1,122,422.  Specification of Letters Patent.  Patented Dec. 29, 1914.

Application filed September 25, 1912. Serial No. 722,209.

*To all whom it may concern:*

Be it known that I, JESSE H. ROSS, of Pascoag, in the county of Providence and State of Rhode Island, have invented certain new and useful Improvements in Methods of Making Pipe-Fittings; and I do hereby declare the following specification, taken in connection with the accompanying drawings, forming a part of the same, to be a full, clear, and exact description thereof.

The invention relates to an improved method of making pipe fittings, and has for its object to provide a pipe fitting with a novel form of seat which is constructed separate from the body portion, and to provide a novel method of firmly securing said seat in the body portion of the fitting.

To these ends the invention consists of the novel construction and arrangement of parts hereinafter described and more particularly set forth in the claims.

In describing the invention in detail reference will be made to the accompanying drawings, in which—

Figure 1 is a fragmentary vertical longitudinal section of a coupling member showing my novel form of seat before it is secured in position. Fig. 2 is a side elevation, partly in section, of a union embodying my improved seat secured in position. Fig. 3 is a similar view of the union before the seat portions are applied. Figs. 4 and 5 are detail side views partly in section of the male and female portions of the seat of the union.

Referring to the drawings, 1 represents the female body member, 2 the male body member, and 3 the coupling-nut of the union. The members 1 and 2 are provided with the usual interior screw-threaded portions 4, and the member 1 is provided with the exterior screw-threaded portion 5 which is adapted to be engaged by the interior threaded portion 6 of the nut 3, while the member 2 has a flange 7 upon the exterior adapted to be engaged by the flange 8 upon the interior of said coupling-nut 3 in the usual manner.

The members 1 and 2 are each provided upon its interior at the inner end with an annular recessed portion 9, shoulder 10 and annular groove 11, as shown in Fig. 3. Each of said members 1 and 2 is provided with a seat portion of different material from said members 1 and 2, and preferably of bronze or similar material. The female seat 12 is in the form of an annular ring or bushing having a beveled face 13 and a tapered inner surface 14, as shown in Fig. 5. The male seat 15 is in the form of an annular bushing having a beveled face 16, annular flange 17, and shank 18 having a tapered inner surface 19, as shown in Fig. 4.

The seats 12 and 15 are secured in position in their respective members in the following manner: The seat is first inserted in the annular recessed portion 9 and forced down on to the shoulder 10, as shown in Fig. 1. A plunger, having a head portion of substantially the same diameter as the larger end of the tapered interior of the seat, is forced along the tapered inner surface of the seat, thereby forcing the metal into the annular groove 11 and locking the seats in engagement with the members 1 and 2, respectively, as shown in Fig. 2. It will be seen that the plunger also removes the taper from the interior of the seats and causes the interior of said seats to be brought into alinement with the interior surface of the male and female body members, and thus to provide an unobstructed passage therethrough.

What I claim as my invention and desire to secure by Letters Patent is:

1. The method of making an article of the character described which consists in providing the interior of the fitting with an annular groove, thence inserting within said fitting a seat member having a plain smooth outer surface and a tapered inner surface, and thence forming an annular shoulder upon said outer surface by forcing the tapered inner surface outward so that a portion of the outer surface will enter the annular groove.

2. The method of making an article of the character described which consists in providing the interior of the fitting with an annular recessed portion, an inwardly extending shoulder at the bottom thereof, an annular groove in said recessed portion adjacent said shoulder, thence inserting within said recessed portion a seat member having an exterior surface engaging the interior of said recessed portion, a tapered interior surface, and an end portion engaging the annular shoulder in said recessed portion, and thence driving a plunger into the tapered interior of said seat member and forcing a portion of the metal upon the exterior into said annular groove thereby forming an annular shoulder upon the exterior of said seat member.

JESSE H. ROSS.

Witnesses:
W. H. THURSTON,
J. H. THURSTON.